United States Patent
Liu et al.

(10) Patent No.: US 10,250,945 B2
(45) Date of Patent: Apr. 2, 2019

(54) REPLAYING SYSTEM AND REPLAYING METHOD

(71) Applicants: Inventec (Pudong) Technology Corporation, Shanghai (CN); INVENTEC CORPORATION, Taipei (TW)

(72) Inventors: Ming-Yuan Liu, Taipei (TW); An-Chi Cheng, Taipei (TW); Huan-Chung Hsu, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 113 days.

(21) Appl. No.: 15/473,630

(22) Filed: Mar. 30, 2017

(65) Prior Publication Data

US 2018/0139504 A1    May 17, 2018

(30) Foreign Application Priority Data

Nov. 17, 2016  (CN) .......................... 2016 1 1024339

(51) Int. Cl.
*H04N 21/422*    (2011.01)
*H04N 21/472*    (2011.01)

(52) U.S. Cl.
CPC ... *H04N 21/47217* (2013.01); *H04N 21/4221* (2013.01); *H04N 21/42224* (2013.01)

(58) Field of Classification Search
CPC .................................................. H04N 21/6587
See application file for complete search history.

(56) References Cited

U.S. PATENT DOCUMENTS

| | | | |
|---|---|---|---|
| 2005/0091693 A1 | 4/2005 | Amine et al. | |
| 2008/0046098 A1 | 2/2008 | Corbin et al. | |
| 2008/0062318 A1* | 3/2008 | Ellis | H04N 5/44543 348/564 |
| 2012/0054612 A1* | 3/2012 | Bok | G06F 3/0488 715/716 |
| 2016/0182924 A1* | 6/2016 | Todd | H04N 21/2343 725/116 |

\* cited by examiner

*Primary Examiner* — Michael H Hong
(74) *Attorney, Agent, or Firm* — CKC & Partners Co., LLC

(57) ABSTRACT

A replaying system includes a playing device and a processor. The playing device is configured to play multimedia data. The processor is coupled to the playing device. The processor is configured to control the playing device to replay data from a second time stamp to a first time stamp of the multimedia data according to a first instruction corresponding to the first time stamp. The processor is further configured to release the data from being replayed according to a second instruction.

17 Claims, 4 Drawing Sheets

REPLAYING SYSTEM AND REPLAYING METHOD

RELATED APPLICATIONS

This application claims priority to Chinese Application Serial Number 201611024339.0, filed Nov. 17, 2016, which is herein incorporated by reference.

BACKGROUND

Technical Field

The present disclosure relates to a replaying technology. More particularly, the present disclosure relates to a replaying system and a replaying method.

Description of Related Art

With the development of technology, users receive information through multimedia data. However, when the users have interests on a specific segment of the multimedia data, the users need to adjust a playing manner of the multimedia data manually.

Therefore, a heretofore-unaddressed need exists to address the aforementioned deficiencies and inadequacies.

SUMMARY

One embodiment of the present disclosure is related to a replaying system. The replaying system includes a playing device and a processor. The processor is coupled to the playing device. The playing device is configured to play multimedia data. The processor is configured to control the playing device to replay data from a second time stamp to a first time stamp of the multimedia data according to a first instruction corresponding to the first time stamp. The processor is further configured to release the data from being replayed according to a second instruction.

Another embodiment of the present disclosure is related to a replaying method. The replaying method includes: controlling a playing device to replay data from a second time stamp to a first time stamp of multimedia data, by a processor, according to a first instruction corresponding to the first time stamp; and releasing the data from being replayed, by the processor, according to a second instruction.

Yet another embodiment of the present disclosure is related to a non-transitory computer readable storage medium storing a computer program. The computer program is configured to execute a replaying method. The replaying method includes: controlling a playing device to replay data from a second time stamp to a first time stamp of multimedia data according to a first instruction corresponding to the first time stamp; and releasing the data from being replayed according to a second instruction.

As described in the above embodiments, the replaying system and the replaying method of this disclosure, the processor controls the replaying device to replay a specific segment of the multimedia data, such that the replaying system satisfies needs of users.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
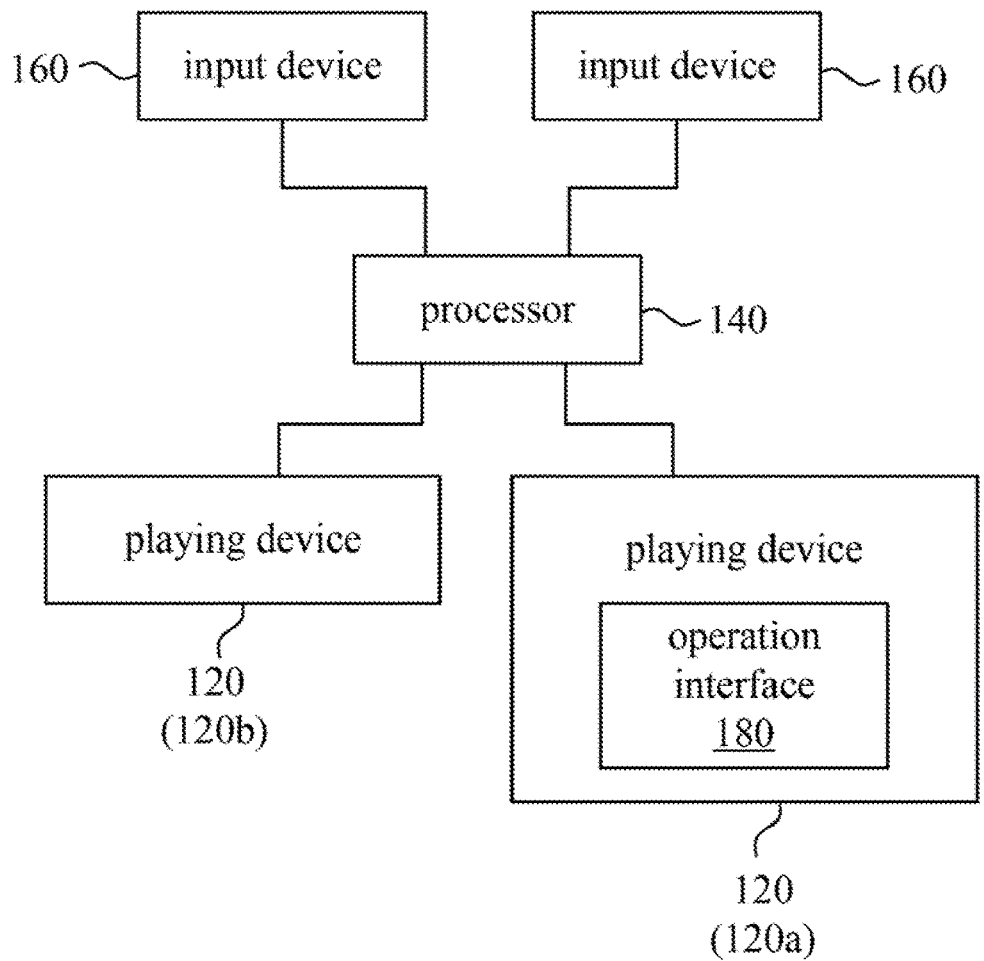
FIG. 1 is a schematic diagram illustrating a replaying system according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts. The embodiments below are described in detail with the accompanying drawings, but the examples provided are not intended to limit the scope of the disclosure covered by the description. The structure and operation are not intended to limit the execution order. Any structure regrouped by elements, which has an equal effect, is covered by the scope of the present disclosure. Moreover, the drawings are for the purpose of illustration only, and are not in accordance with the size of the original drawing. The components in description are described with the same number to understand.

Unless otherwise defined, all terms used in this specification and claims generally have their ordinary meaning in the art, within the context of the disclosure, and in the specific context where each term is used. Certain terms that are used to describe the disclosure are discussed below, or elsewhere in the specification, to provide additional guidance to the practitioner regarding the description of the disclosure.

As used herein with respect to the "first", "second" . . . is not special order or pick the alleged meaning, but simply to distinguish the operation described in the same terms or elements of it.

The terms "comprises", "comprising", "includes", "including", "has", "having" . . . etc. used in this specification are open-ended and their meaning are "comprises but not limited".

Reference is now made to FIG. 1. FIG. 1 is a schematic diagram illustrating a replaying system 100 according to some embodiments of the present disclosure. As illustratively shown in FIG. 1, the replaying system 100 includes at least one replaying device 120 and a processor 140. The replaying device 120 is coupled to the processor 140.

As used herein, "coupled" or "connected" may refer to two or more elements are in direct physical or electrical contact made, or indirectly, as a mutual entity or electrical contact, and "coupled" or "connected" may also refer to two or more elements are operating or action.

The playing device 120 is configured to play multimedia data. In some embodiments, the playing device 120 includes a playing device 120a and a playing device 120b. The playing device 120a is, for example, a video player (e.g., a display panel). The playing device 120b is, for example, an audio player (e.g., a speaker). The multimedia data is, for example, audio data, video data, or a combination thereof.

In some embodiments, the playing device 120a and the playing device 120b may be integrated as a single playing device.

The processor 140 is configured to control the playing device 120 to play multimedia data. The processor 140 is, for example, a central processing unit (CPU), a processing chip or other hardware elements having processing and controlling function (e.g., a processing circuit).

In some embodiments, the replaying system 100 further includes one or more input devices 160. The input devices 160 are coupled to the processor 140. The input devices 160 are, for example, a keyboard, a mouse, a touch panel, a touch pad, or various input devices. When a user operates one of the aforementioned input devices 160, the processor 140 receives corresponding instructions. Then, the processor 140 controls the playing device 120 to play the multimedia data according to these instructions.

In some embodiments, the playing device 120, the processor 140, and the input devices 160 are included in a desk-top computer system, a notebook, a tablet, a smart phone, or various electronic systems, but the present disclosure is not limited thereto.

Figure 2:
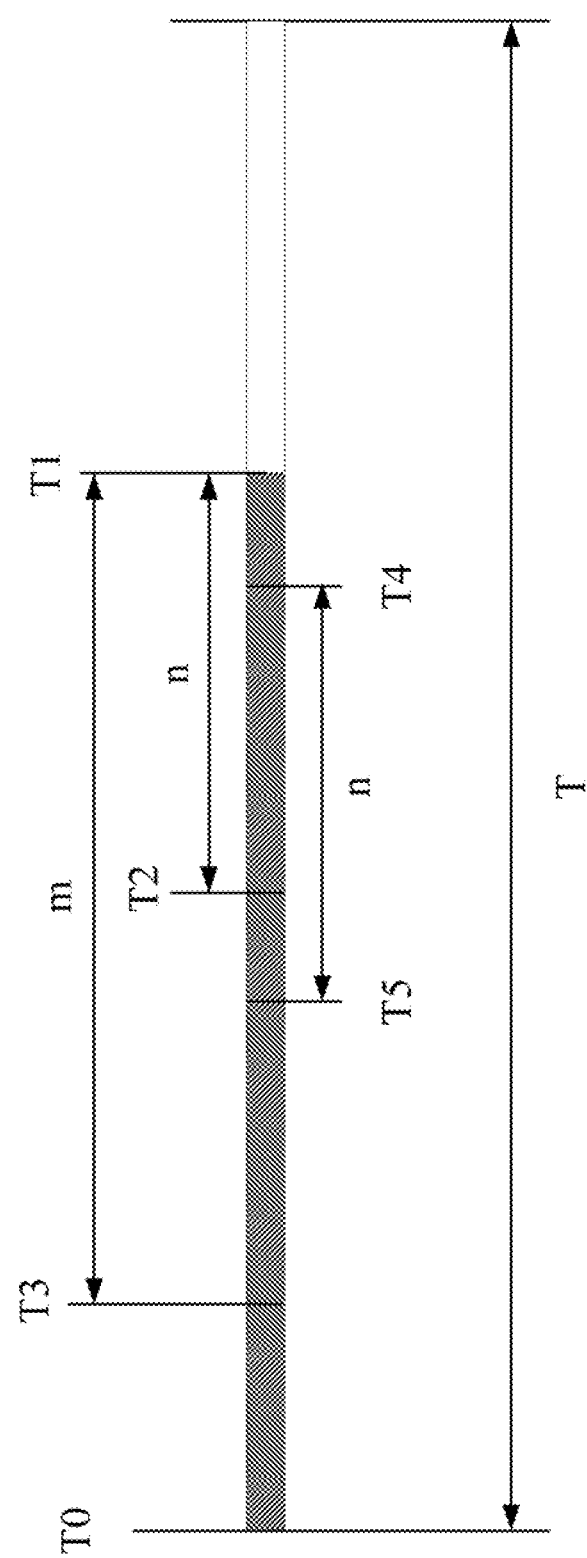
FIG. 2 is a schematic diagram illustrating multimedia data according to some embodiments of this disclosure.

Then, references are now made to FIG. 1 and FIG. 2. FIG. 2 is a schematic diagram illustrating multimedia data according to some embodiments of this disclosure. For illustration, a time length of the multimedia data is referred as T. Generally, the multimedia data includes a plurality of time stamps. In some embodiments, the playing device 120 plays the multimedia data from a starting time stamp T0. In some embodiments, when the multimedia data is played to the first time stamp T1, the multimedia data is stopped being played if the user presses a spacebar of a keyboard once. If the user presses the spacebar again, the multimedia data is resumed from the first time stamp T1.

In some embodiments, the processor 140 is configured to control the playing device 120 to replay data, which is presented from a second time stamp T2 to the first time stamp T1, of the multimedia data according to a first instruction corresponding to the first time stamp T1. The processor 140 is further configured to release the replaying operation according to a second instruction.

For example, under a condition that the multimedia data is played to the first time stamp T1, if the user presses the spacebar twice in 0.5 seconds (first condition), the processor 140 receives a corresponding first instruction. The processor 140 controls the playing device 120 to return to the second time stamp T2 according to the first instruction. Then, the processor 140 controls the playing device 120 to replay the data, which is presented from a second time stamp T2 to the first time stamp T1, of the multimedia data. The data of the multimedia data from the second time stamp T2 to the first time stamp T1 is replayed continually until the user presses the spacebar again (second condition). Accordingly, the processor 140 receives a corresponding second instruction, and releases the replaying operation (e.g., replaying the data, which is presented from the second time stamp T2 to the first time stamp T1, of the multimedia data) according to the second instruction. In other words, when the multimedia data is played to the first time stamp T1, the playing device 120 plays the data after the first time stamp T1, and the playing device 120 would not return to the second time stamp T2.

It is noted that the spacebar is taken as an example in above-mentioned embodiments, but is not limited thereto. In some other embodiments, the above-mentioned spacebar may be replaced with other physical buttons of the keyboard, buttons of the mouse, virtual keyboards of the touch panel, specific touch gestures (e.g., zoom-in/zoom-out gestures or other gestures) on the touch pad. In other words, the first instruction and/or the second instruction are corresponding to at least one of the input devices 160. In some embodiments, the first instruction and the second instruction are corresponding to a same input device 160. In some other embodiments, the first instruction and the second instruction are corresponding to two different input devices 160 respectively.

In some embodiments, the processor 140 is configured to control the playing device 120 to replay the data, which is presented from a third time stamp T3 to the first time stamp T1, of the multimedia data according to a third instruction corresponding to the first time stamp T1. The third instruction is different from the first instruction, and the third time stamp T3 is different from the second time stamp T2.

For example, under a condition that the multimedia data is played to the first time stamp T1, if the user presses the spacebar triple times in 0.5 seconds (third condition), the processor 140 receives a correspond third instruction. The processor 140 controls the playing device 120 to return to the third time stamp T3 according to the third instruction. Then, the processor 140 controls the playing device 120 to replay the data, which is presented from the third time stamp T3 to the first time stamp T1, of the multimedia data. During the replaying procedure, if the user presses the spacebar once, the processor 140 receives the corresponding second instruction, and releases the replaying operation according to the second instruction. In some embodiments, since the third time stamp T3 is different from the second time stamp T2, a time length (e.g., m seconds) from the third time stamp T3 to the first time stamp T1 is different from a time length (e.g., n seconds) from the second time stamp T2 to the first time stamp T1. Briefly, different instructions correspond to different time lengths respectively. For example, the first instruction corresponds to n seconds, and the third instruction corresponds to m seconds.

In addition, in some embodiments, under a condition that the multimedia data is replayed (e.g., the data from the second time stamp T2 to the first time stamp T1 is replayed), if the user presses the spacebar twice in 0.5 seconds (first condition) when the multimedia data is played to the fourth time stamp T4, the processor 140 receives the corresponding first instruction. As illustratively shown in FIG. 2, the fourth time stamp T4 is between the second time stamp T2 and the first time stamp T1. Then, the processor 140 controls the playing device 120 to return to a fifth time stamp T5 according to the first instruction, such that the playing device 120 replays the data, which is presented from the fifth time stamp T5 to the fourth time stamp T4, of the multimedia data. Similarly, since the first instruction corresponds to n seconds, the processor 140 controls the playing device 120 to replay the data of the multimedia data from the fifth time stamp T5, which is before the fourth time stamp T4 about n seconds. In other words, the time length (e.g., n seconds) from the fifth time stamp T5 to the fourth time stamp T4 is equal to the time length from the second time stamp T2 to the first time stamp T1.

Figure 3:
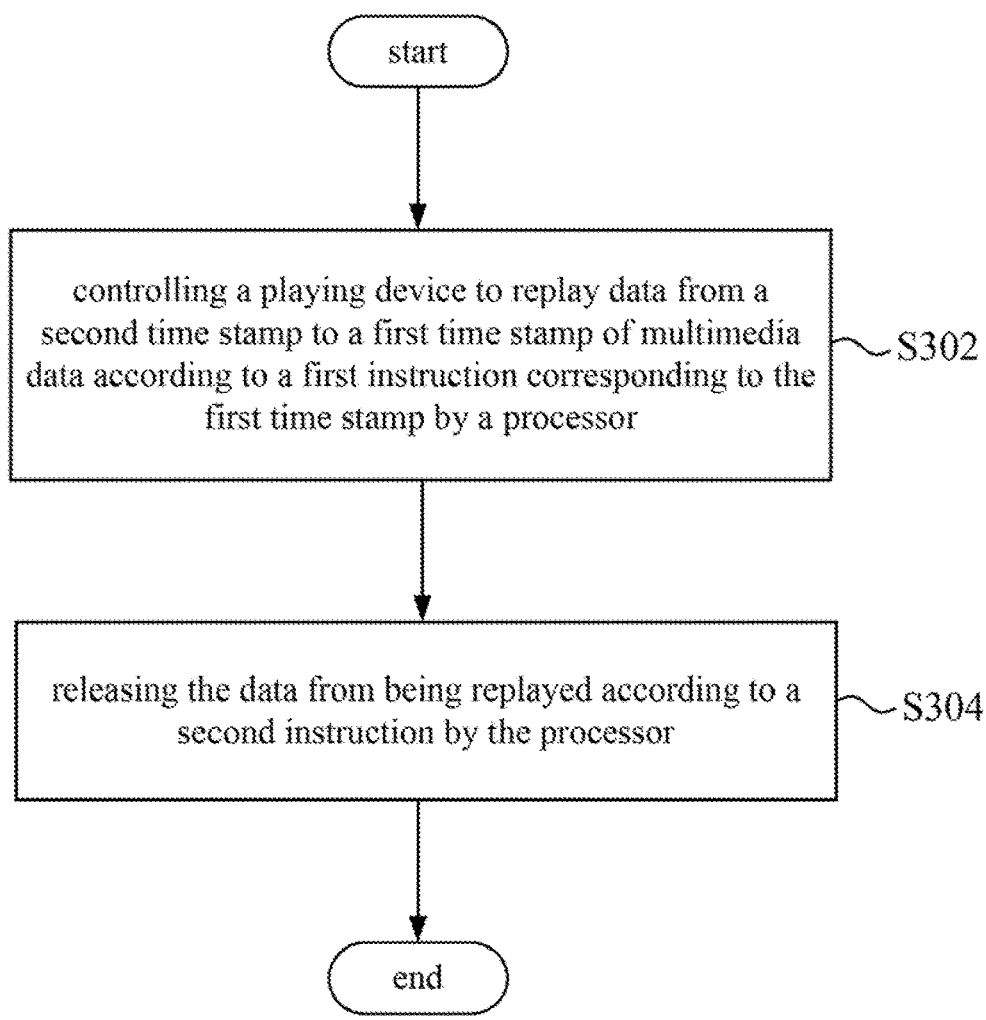
FIG. 3 is a flow diagram illustrating a replaying method according to some embodiments of this disclosure.

Reference is now made to FIG. 3. FIG. 3 is a flow diagram illustrating a replaying method 300 according to some embodiments of this disclosure. In some embodiments, the replaying method 300 is implemented to the replaying system 100 in FIG. 1.

In step S302, the processor 140 controls the playing device 120 to replay the data, which is presented from the second time stamp T2 to the first time stamp T1, of the multimedia data according to the first instruction. In step S304, the processor 140 releases the data from being replayed according to the second instruction.

In some embodiments, the above-mentioned replaying method 300 is implemented as a computer program codes. The computer program codes are stored in a storing device (e.g., a non-transitory computer readable storage medium) and are configured to be executed by the processor 140, such that the corresponding operations are implemented.

Figure 4:
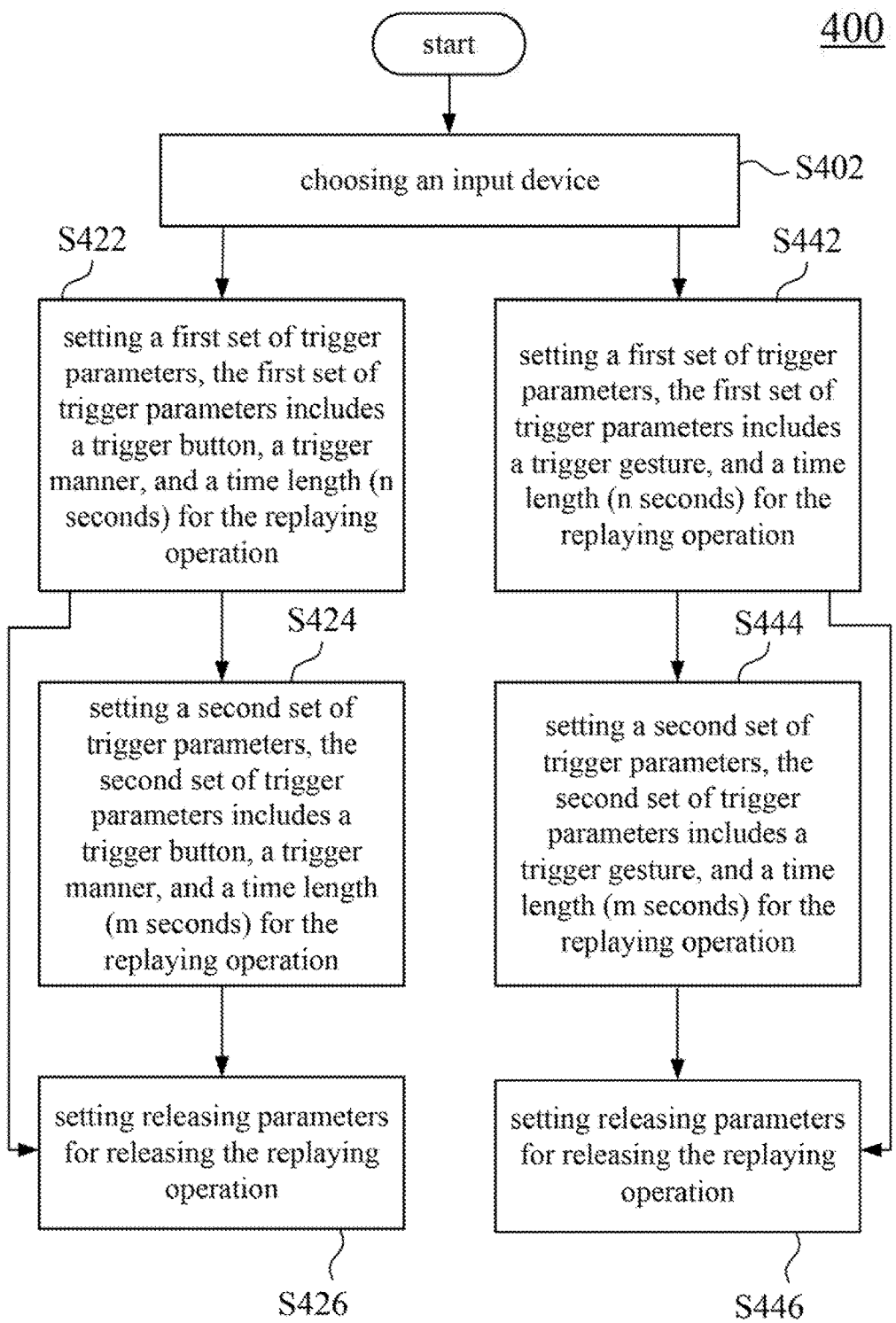
FIG. 4 is a flow diagram illustrating relevant settings of the replaying system in FIG. 1 according to some embodiments of this disclosure.

Reference is now made to FIG. 4. FIG. 4 is a flow diagram illustrating setting method 400 of the replaying system 100 in FIG. 1 according to some embodiments of this disclosure. In some embodiments, the above-mentioned first condition corresponding to the first instruction, the second condition corresponding to the second instruction, the third condition corresponding to the third instruction, the time length from the second time stamp T2 to the first time stamp T1, or the time length from the third time stamp T3 to the first time stamp T1 are able to be set by the user according to practical needs.

For example, the processor 140 executes a specific software, such that the playing device 120a or other displaying device to display an operation interface 180, as illustratively shown in FIG. 1. The user may perform the following setting flow through the operation interface 180.

At first, in step S402, the user may choose an input device 160. The input device 160 includes a keyboard, a mouse, a touch panel, a touch pad, or various input devices.

If the user chooses the keyboard, the mouse, or the couch panel, step S422 is entered. In step S422, the user may set a first set of trigger parameters. These trigger parameters are configured to trigger the replaying operation. The first set of trigger parameters includes a trigger button, a trigger manner, and a time length for the replaying operation. The trigger button is, for example, the spacebar, a left button of the mouse, a specific button of the virtual keyboard of the touch panel. The trigger manner is, for example, to press a button twice in 0.5 seconds. The time length for the replaying operation is n seconds (e.g., 20 seconds).

In some embodiments, in step S424, the user may set a second set of trigger parameters. The trigger button is, for example, the spacebar, the left button of the mouse, the specific button of the virtual keyboard of the touch panel. The trigger manner is, for example, to press the button triple times in 0.5 seconds. The time length for the replaying operation is m seconds (e.g., 40 seconds).

In some embodiments, in step S426, the user may set releasing parameters for releasing the replaying operation. The releasing parameters include a releasing button and a releasing manner. The releasing button is, for example, the spacebar, the left button of the mouse, or the specific button of the virtual keyboard of the touch panel. The releasing manner is, for example, to press the button once.

In step S402, if the user chooses the touch pad, step S442 is entered. Similarly, the user may set a first set of trigger parameters. The first set of trigger parameters includes a touch gesture and a time length for the replaying operation. The touch gesture is, for example, a zoom in gesture. The time length for replaying operation is, for example, 20 seconds. In some embodiments, in step S444, the user may set a second set of trigger parameters. A touch gesture of the second set of trigger parameter is, for example, a zoom out gesture. The time length for the replaying operation is, for example, 40 seconds. In some embodiments, in step S446, the user may set the releasing gesture for releasing the replaying operation. The releasing gesture is, for example, to slip a finger toward a specific direction.

The above description of the setting method 400 includes exemplary operations, but the operations of the setting method 400 are not necessarily performed in the order described. The order of the operations of the setting method 400 disclosed in the present disclosure are able to be changed, or the operations are able to be executed simultaneously or partially simultaneously as appropriate, in accordance with the spirit and scope of various embodiments of the present disclosure.

As the above embodiments, the replaying system and the replaying method of this disclosure, the processor controls the replaying device to replay a specific segment of the multimedia data, such that the replaying system satisfies needs of users.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A replaying system, comprising:
a playing device configured to play multimedia data; and
a processor coupled to the playing device, wherein the processor is configured to control the playing device to replay data from a second time stamp to a first time stamp of the multimedia data according to a first instruction corresponding to the first time stamp, and the processor is further configured to release the data from being replayed according to a second instruction; wherein the first instruction is corresponding to pressing a spacebar of a keyboard twice in 0.5 seconds.

2. The replaying system of claim 1, wherein the playing device is configured to provide an operation interface, and the processor is further configured to determine a time length from the second time stamp to the first time stamp according to an operation on the operation interface.

3. The replaying system of claim 1, wherein the processor is further configured to control the playing device to replay data from a third time stamp to the first time stamp of the multimedia data according to a third instruction corresponding to the first time stamp, wherein the third instruction is different from the first instruction, and the third time stamp is different from the second time stamp.

4. The replaying system of claim 1, further comprising:
a plurality of input devices coupled to the processor, wherein the first instruction and the second instruction are corresponding to at least one of the plurality of input devices.

5. The replaying system of claim 1, wherein the first instruction or the second instruction is corresponding to a touch gesture.

6. The replaying system of claim 1, wherein the first instruction and the second instruction are corresponding to two different touch gestures respectively.

7. The replaying system of claim 3, wherein the third instruction is corresponding to pressing a spacebar of a keyboard triple times in 0.5 seconds.

8. The replaying system of claim 3, wherein the processor is further configured to control the playing device to replay data from a fifth time stamp to a fourth time stamp of the multimedia data according to the first instruction corresponding to a fourth time stamp, wherein a first time length from the fifth time stamp to the fourth time stamp is equal to a second time length from the second time stamp to the first time stamp, and the fourth time stamp is between the second time stamp and the first time stamp.

9. The replaying system of claim 4, wherein the first instruction and the second instruction are corresponding to two different input devices of the plurality of input devices respectively.

10. A replaying method, comprising:
controlling a playing device to replay data from a second time stamp to a first time stamp of multimedia data, by a processor, according to a first instruction corresponding to the first time stamp, wherein the first instruction is corresponding to pressing a spacebar of a keyboard twice in 0.5 seconds; and
releasing the data from being replayed, by the processor, according to a second instruction.

11. The replaying method of claim 10, further comprising:
controlling the playing device to replay data from a third time stamp to the first time stamp of the multimedia data, by the processor, according to a third instruction corresponding to the first time stamp,
wherein the third instruction is different from the first instruction, and the third time stamp is different from the second time stamp.

12. The replaying method of claim 10, further comprising:
providing an operation interface by the playing device; and
determining a time length from the second time stamp to the first time stamp, by the processor, according to a first operation on the operation interface.

13. The replaying method of claim 11, further comprising:
controlling the playing device to replay data from a fifth time stamp to a fourth time stamp of the multimedia data, by the processor, according to the first instruction corresponding to the fourth time stamp,
wherein a first time length from the fifth time stamp to the fourth time stamp is equal to a second time length from the second time stamp to the first time stamp, and the fourth time stamp is between the second time stamp and the first time stamp.

14. The replaying method of claim 12, further comprising:
determining a set of trigger parameters, by the processor, according to a second operation on the operation interface,
wherein the set of trigger parameters are corresponding to a trigger button, a trigger manner, and a time length of a replaying operation.

15. The replaying method of claim 12, further comprising:
determining a set of trigger parameters, by the processor, according to a third operation on the operation interface,
wherein the set of trigger parameters are corresponding to a trigger gesture and a time length of a replaying operation.

16. The replaying method of claim 12, further comprising:
determining a set of releasing parameters, by the processor, according to a fourth operation on the operation interface,
wherein the set of releasing parameters are corresponding to a releasing button and a releasing manner.

17. A non-transitory computer readable storage medium storing a computer program, wherein the computer program is configured to execute a replaying method, and the replaying method comprises:
controlling a playing device to replay data from a second time stamp to a first time stamp of multimedia data according to a first instruction corresponding to the first time stamp, wherein the first instruction is corresponding to pressing a spacebar of a keyboard twice in 0.5 seconds; and
releasing the data from being replayed according to a second instruction.

* * * * *